United States Patent [19]

Kawai et al.

[11] Patent Number: 4,764,083
[45] Date of Patent: Aug. 16, 1988

[54] DISCHARGE RING SUPPORTING STRUCTURE OF ADJUSTABLE-BLADE AXIAL-FLOW TURBINE

[75] Inventors: Jyuichiro Kawai, Hitachi; Isao Yanagida, Jyuuou, both of Japan

[73] Assignee: Hitachi, Ltd., Tokyo, Japan

[21] Appl. No.: 895,738

[22] Filed: Aug. 12, 1986

[30] Foreign Application Priority Data

Aug. 19, 1985 [JP] Japan .................. 60-181510

[51] Int. Cl.⁴ ............................................. F04D 29/60
[52] U.S. Cl. ..................................... 415/201; 415/118;
415/DIG. 3; 188/318; 242/562; 242/631;
242/636; 464/170
[58] Field of Search ............... 415/201, 118, 219 R,
415/DIG. 3, 126, 127, 140, 142; 464/170;
248/636, 560, 562, 631; 188/378, 313, 318, 285

[56] References Cited

U.S. PATENT DOCUMENTS

| | | | |
|---|---|---|---|
| 3,181,232 | 5/1965 | Challender | 415/201 |
| 3,787,019 | 1/1974 | Freitag | 248/562 |
| 3,832,087 | 8/1974 | Lohonen et al. | 415/219 R |
| 4,050,660 | 9/1977 | Eggmann et al. | 415/219 R |
| 4,212,087 | 7/1980 | Mortensen | 188/313 |
| 4,277,639 | 7/1981 | Olsson | 248/562 |
| 4,395,198 | 7/1983 | Schucker | 415/219 R |
| 4,417,850 | 11/1983 | Hacker et al. | 415/142 |

FOREIGN PATENT DOCUMENTS

| | | | |
|---|---|---|---|
| 602949 | 9/1934 | Fed. Rep. of Germany | 248/560 |
| 1141144 | 8/1957 | France | 415/DIG. 3 |
| 63028 | 5/1980 | Japan | 188/285 |
| 8474 | 1/1985 | Japan | 415/219 R |
| 664011 | 1/1952 | United Kingdom | 415/201 |
| 789946 | 1/1958 | United Kingdom | 415/DIG. 3 |

*Primary Examiner*—Robert E. Garrett
*Assistant Examiner*—John T. Kwon
*Attorney, Agent, or Firm*—Fay, Sharpe, Beall, Fagan, Minnich & McKee

[57] ABSTRACT

A discharge ring supporting structure of an adjustable-blade axial-flow turbine comprises upper and lower halves separated along a horizontal plane passing through the central axis of the discharge ring. The lower half of the discharge ring is supported by a plurality of supporting columns, each having upper and lower supporting members. The upper supporting members are detachably connected between the lower half of the discharge ring and the lower supporting member. When it is desired to remove the runner, the discharge ring is separated into the upper and lower halves, and the upper supporting members of the supporting columns are removed so that the discharge ring can be lowered. Lowering of the discharge ring allows the runner to be lowered and then removed axially without the runner blades contacting the discharge ring. The upper supporting members of the discharge ring supporting columns are provided with a vibration damper for damping vibration in the discharge ring.

10 Claims, 4 Drawing Sheets

DISCHARGE RING SUPPORTING STRUCTURE OF ADJUSTABLE-BLADE AXIAL-FLOW TURBINE

BACKGROUND OF THE INVENTION

This invention relates to an improvement on a discharge ring supporting structure of an adjustable-blade axial-flow turbine.

A conventional bulb-type axial-flow turbine, which is a kind of an adjustable-blade axial-flow turbine, comprises a bulb axially disposed in a water flow and containing therein a generator and a main shaft, a runner fitted to the end of the bulb and connected to the main shaft, an outer casing surrounding the bulb for guiding water flow into the runner, adjustable wicket gates controlling the water flow into the runner, an outer wicket gate case, and a discharge ring surrounding the runner. The runner has a plurality of adjustable blades, the tips of which are formed such that the rotational trace of the tips of the blades is partially spherical so that the tips are disposed on the same partially spherical rotating trace even when the blades are opened and closed. The discharge ring is disposed axially between the outer wicket gate case and a draft tube in order to minimize water flow loss, the discharge ring has a partially spherical inner surface facing the tips of the runner blades with a small seal gap therebetween that, being coaxial of the partial spherical shape, forms a throat portion immediately downstream of the runner blades. The throat portion has a smaller diameter than that of the runner blades.

The discharge ring is secured to the outer wicket gate case on the upstream side, and on the downstream side a gap is provided between the discharge ring and the draft tube to make it easy to assemble and disassemble the discharge ring. The gap is sealed by a loose flange mechanism to prevent water leakage.

The combined outer wicket gate case and the discharge ring is exposed without being covered with a material such as concrete. The outer wicket gate case and the discharge ring are deflected by their own weight and water weight, with the upstream side end of each of the outer wicket gate case and the discharge ring acting as a fulcrum. The deflection becomes larger as the capacity of the turbine increases. Originally, the axial-flow turbine was used for low head. The shell thickness of tubular structures employed in the axial-flow turbine is thinner than the other kinds of water turbines, so that the rigidity of the tubular structures is small. Consequently its spring constant and its natural vibration frequency also are small. When the natural vibration frequency accords with the vibration frequency $f_r$ caused by water pressure, resonance takes place. This sometimes causes large troubles such as structure rupture or contact between the runner blades and the discharge ring to occur. Further, when the turbine runs under partial load, or in overload, swirling flow is easily caused downstream of the runner, whereby eddies and water pressure vibration take place. Therefore, vibration is easily caused in the discharge ring. In particular, since the adjustable-blade axial-flow turbine has a discharge ring exposed without being covered with concrete as above-mentioned, and since the turbine is disposed axially, the tubular structure is likely to be bent. Its rigidity against deflection and spring constant can not be made sufficiently high, so that resonance and unusual vibration take place sometimes.

The conventional discharge ring is supported by a pair of supporting feet and concrete columns connected to the supporting feet and a concrete floor or base. The supporting feet each are provided on the periphery of the discharge ring at the throat portion.

The spring constant $K_c$, in the vertical direction, of the supporting feet and the concrete columns, which are integrated with the discharge ring, is usually made higher than the bending spring constant $K_b$ of the axial tubular structure constructed of the discharge ring and the outer wicket gate case. The total spring constant $K_t$ is given by the following equation;

$$K_t = (K_c \cdot K_b)/(K_b + K_c).$$

$K_c$ is much larger than $K_b$, so that $K_t$ is nearly equal to $K_b$. Namely, the spring constant for the bending of the tubular structure relies only on the bending spring constant. The supporting feet and concrete columns each are not adjustable in spring constant after their manufacturing, so that if they are made such that the natural vibration frequency of the tubular structure determined by the total spring constant $K_t$ is equal to the water pressure vibration frequency $f_r$, the structure is brought into resonance. This can cause the above-mentioned troubles.

At present, it is not sufficient to precisely anticipate in the design stage whether or not the resonance takes place. Therefore, there is the probability that such troubles can occur relatively often. As mentioned above the supporting structure comprising the supporting feet of the discharge ring and their concrete columns can not be changed in the rigidity, so that there is no way for shifting the resonance point of the tubular structure comprising the discharge ring and the outer wicket gate case other than reinforcing the structure. This reinforcement operation consumes much time and money, further it accompanies technical difficulty such that deformation caused by the reinforcement must be made small.

Further, in a transitional operation of the water turbine such as starting or emergent stopping, a large magnitude of the vibration takes place temporarily.

In the conventional structure, the vibrator, that is, the supporting structure and the tubular structure has no factor for raising a damping effect. The damping effect relies only on solid body damping due to internal friction caused in the material of the structure, so that the vibration of a large magnitude which temporarily takes place can not be easily damped and the vibrator is maintained under a dangerous condition for a long time. In this period, it is likely that the runner blades will contact with the discharge ring.

Further, the conventional structure has an economical drawback in addition to the problem relating to the vibration.

As mentioned above, the seal gap is formed between the blade tips and the discharge ring facing the tip. The seal gap has a partially spherical shape which has the throat portion on the immediately downstream side of the blades. The radius of the discharge ring at the throat portion is smaller by $G_1$ than each of the blades at the throat portion. In the disassembly of the turbine, for example, the runner is removed from the bulb by horizontally moving the runner. The runner, however, contacts with the discharge ring at the throat portion so that the runner can not be removed from the bulb. Therefore, the conventional discharge ring is divided by a vertical plane into two parts, a left half and a right half. In advance of the removal of the runner, the left and right halves of the discharge ring are moved horizontally enough not to contact with the runner. Therefore, a housing in a power plant needs the width W given by the following equation:

$$W = 2 \times (E + B + h) + D$$

wherein
- D: the maximum diameter of the runner blades,
- E: the distance between the housing and the one half of the discharge ring when the left and right halves have been moved horizontally enough to remove the runner,
- B: the scale of the left or right half in the horizontal and radial direction, and
- h: the distance between the runner blades and the discharge ring when the runner is removed.

For the conventional turbine, it is necessary to make the housing width large for assembling and disassembling, so that the turbine is remarkably uneconomical.

Further, the mounting floor for the discharge ring is the lowest in the housing of the power plant. On the floor, various devices such as waste water pumps, feed water pumps, leakage oil tanks, lubrication oil tanks, etc. which are necessary to operate the turbine. In order to avoid contact with these various devices, the devices are shifted in the positions where they are not in contact with the discharge ring when horizontally moved, so that the housing is made larger by such a scale. Additionally, the discharge ring removed from the bulb is stored in an assembling room of the power plant, so that a wide space is necessary for storage of the discharge ring in addition to the other parts during the overhaul.

SUMMARY OF THE INVENTION

An object of the present invention is to provide a discharge ring supporting structure of an adjustable-blade axial-flow turbine which is able to reduce the width of a power plant housing containing the turbine and to provide vibration damping of the discharge ring to increase the reliability of the turbine such that the discharge ring does not come in contact with the runner blades.

Briefly stated, the present invention is characterized in that the discharge ring is divided into upper and lower halves by a horizontal plane including the axis of the discharge ring. A discharge ring supporting structure comprises a plurality of supporting members axially integrated for supporting the lower half discharge ring. One of the plurality of supporting members is detachably mounted on the other so that the height of the integrated supporting members can be adjusted and the upper and lower half discharge rings can be moved upwards and downwards, respectively whereby the runner can be moved horizontally without contacting with the discharge ring, and disassembled.

According to an aspect of the invention, one of the plurality of supporting members has a smaller spring constant than the other, and is and provided with a vibration damper for damping vibration caused in the disclosure ring.

DESCRIPTION OF THE PREFERRED EMBODIMENT

Figure 1:
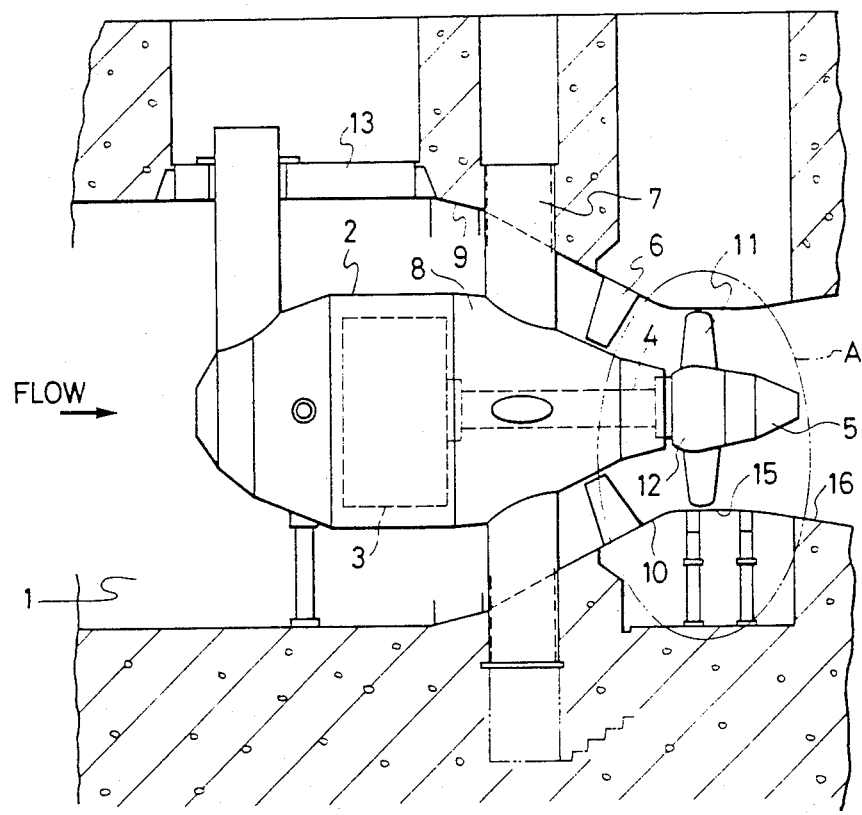
FIG. 1 is a side view of an adjustable-blade axial-flow turbine employing an embodiment of a discharge ring supporting structure according to the present invention.

First, an adjustable-blade axial-flow turbine employing an embodiment of the present invention will be described hereunder in detail, referring to the drawings.

In FIG. 1 showing an adjustable-blade axial-flow bulb type turbine which is a kind of an adjustable-blade axial-flow turbine. The turbine is axially disposed in a water passageway 1. The turbine comprises a bulb 2 containing therein a generator 3 and a main shaft 4 connected to the generator, a runner 5 mounted on an end portion of the bulb 2 so as to be detachable in an axial direction, adjustable wicket gates 6, stay vanes 7 etc. The stay vanes 7 are fixed to an inner casing 8 forming a shell of the bulb 3 and an outer casing 9. The wicket gates 6 are mounted on an outer wicket gate or vane case 10, the upperstream side of which is secured to the downstream side of the outer casing 9. The runner 5 is provided with a plurality of adjustable runner vanes or blades 11 at a runner boss 12 which contains a blade driving mechanism for driving the plurality of blades in synchronism with each other so as to change a blade angle against the runner axis. The upstream side of the runner boss 12 is fitted in the end of the bulb 2 and fixed to the main shaft 4 as mentioned above. The blades form a partially spherical shape by the blade tips rotating around the runner axis. A discharge ring 15 is provided so as to surround the blades 11 with a seal gap. The upstream side of the discharge ring 15 is mounted to the downstream side of the outer vane case 10, and the downstream side to a draft tube 16. 13 is a hatch cover.

Figure 3:
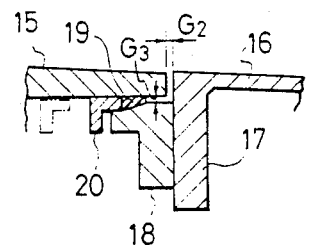
FIG. 3 is an enlarged sectional view of a part of FIG. 2 enclosed by a line indicated by B.

Water under pressure for rotating the runner 5 flows from the water passageway 1 into the runner blades 11 via the outer casing 9 and the wicket gates 6 for regulating the quantity of the water flow. The energy of the water under pressure is changed into rotational energy which is transferred to the generator 3 thereby to output the energy as electric power. In order to use most effectively the water flowing into the blades 11, it is necessary to minimize a gap between the blades 11 and a water guide tube for guiding the water. The discharge ring 15 serves the role of the water guide tube. In general, the discharge ring 15 is connected to the downstream side of the outer vane case 10 which holds bearings of the wicket gates 6 and an operating mechanism thereof. A small seal gap between the discharge ring 15 and the runner blades 11 is defined. The runner blade tips are formed so that the rotating blade tips form a partially spherical shape. And the inner surface of the discharge ring 15 opposing the blade tips also is formed in a partially spherical shape of the same center as the partially spherical shape formed by the rotating blade tips, so that the distances between the inner surface of the discharge ring 15 and the blade tips do not change even if the blades 11 are opened or closed (namely, even if the blade angle to the runner axis is changed). The discharge ring 15, therefore, has a throat portion, on the downstream side of the spherical surface whose inner diameter is smaller by two times G1 than the diameter of the partially spherical shape of the rotating blade tips. The downstream side of the discharge ring 15 extends to the flange 17 of the draft tube 16. This portion is shown in FIG. 3 in detail. A gap $G_2$ between the flange 17 and the end of the discharge ring 15 is provided for ease of assembly and disassembly. The gap $G_2$ is sealed by a loose flange mechanism comprising a packing box 18 disposed with a gap $G_3$ between the outer surface of the discharge ring 15 and the packing box 18, a packing 19, and a companion flange 20.

Figure 2:
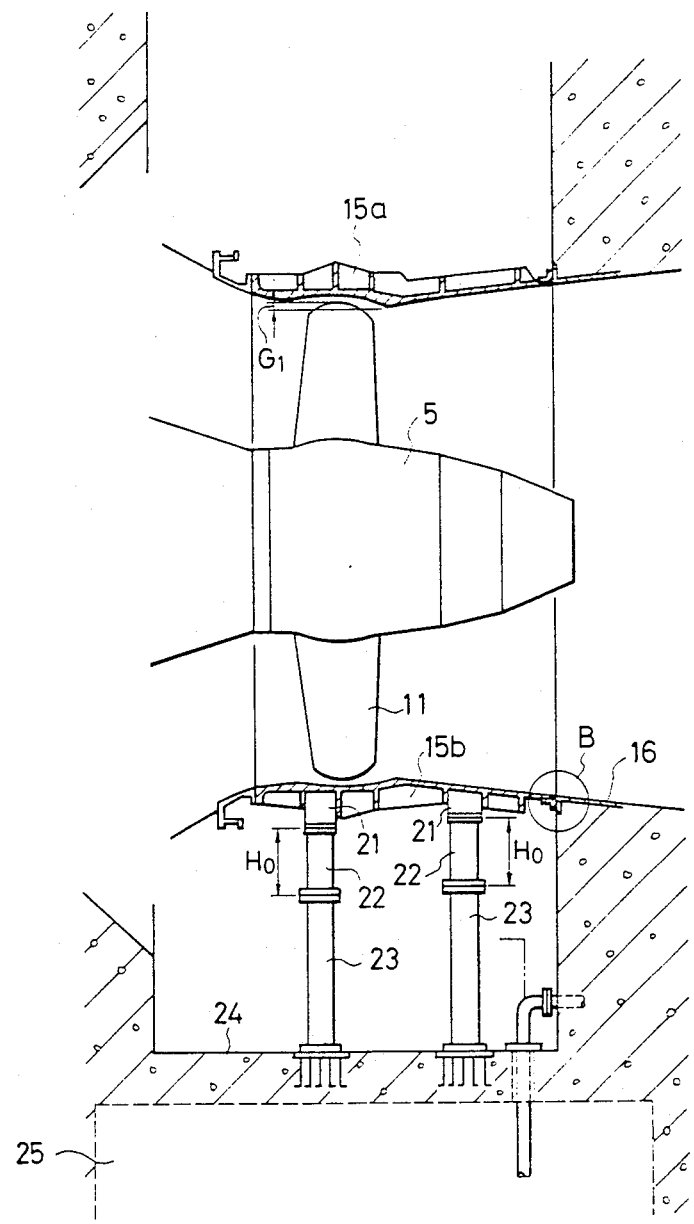
FIG. 2 is an enlarged sectional view of a part of FIG. 1 enclosed by a dotted line indicated by A.

Referring to FIG. 2, the discharge ring 15 and a supporting structure are further described hereinunder in detail.

The discharge ring 15 is divided into an upper half 15a and a lower half 15b by a horizontal plane including the axis of the discharge ring 15, and the upper and lower halves 15a, 15b are brought into a contact with each other in the state of assembly. The lower half discharge ring 15b has supporting feet 21 secured to the lower portion thereof. The supporting feet 21 are supported by supporting columns made of iron material. Each of the supporting columns comprises two pieces, an upper supporting column 22 and a lower supporting column 23. The upper supporting column 22 is detachably mounted on the lower supporting column 23 and supports the lower half discharge ring 15b.

The upper and lower supporting columns 22, 23 are disposed on the floor 24 at two positions spaced from each other in a peripheral direction of the discharge ring 15 and at least one position distant in an axial direction from the abovementioned two positions. It is preferable to support the discharge ring 15b with at least three positions as mentioned above.

Figure 5:
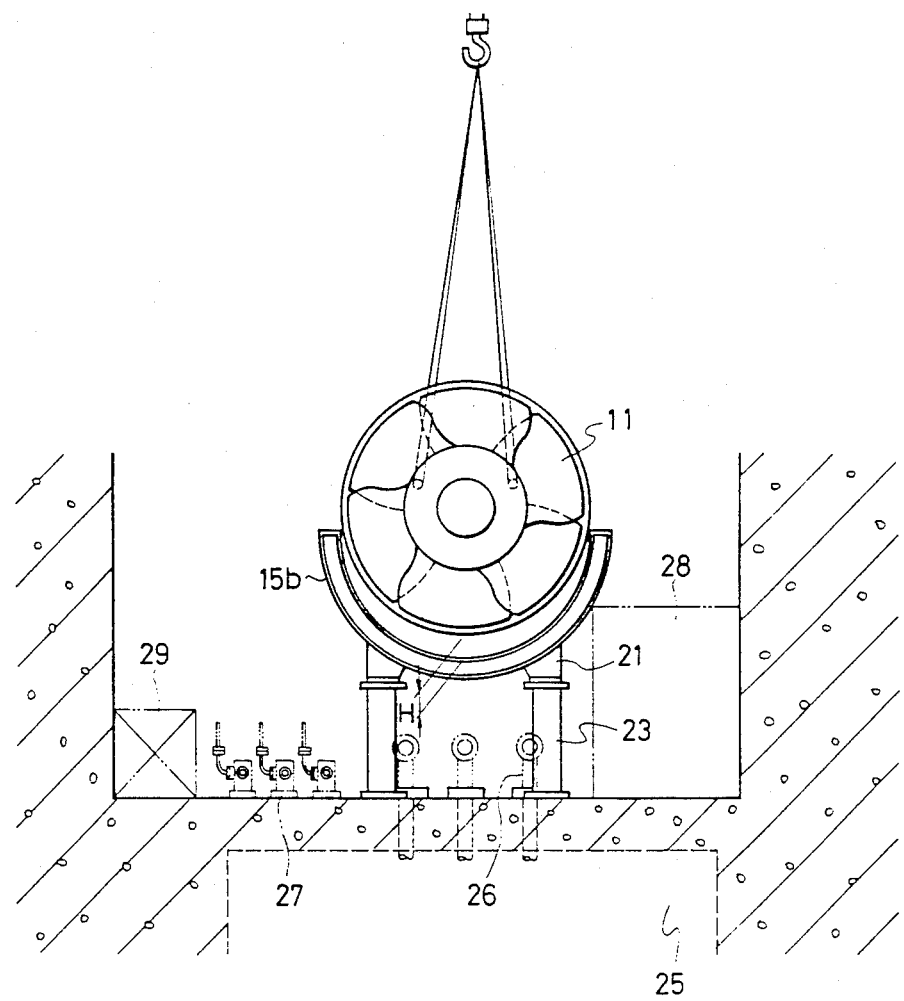
FIG. 5 is an explanation view for assembling and disassembling a discharge ring of the adjustable-blade axial-flow turbine.

When the runner is removed from the main shaft 4 and carried out of the discharge ring 15, first, bolts (not shown) mounting the abutment of the upper and lower half discharge ring 15a, 15b are loosened and taken out, and the upper half discharge ring 15a is suspended to separate it from the lower half discharge ring 15b. Then, the upper support columns 22 are taken out and the supporting feet of the lower half discharge ring 15b are disposed on the lower half columns 23 as shown in FIG. 5. After that the runner 5 is removed by moving it horizontally. The height $H_0$ of the upper support column 22 is larger than the decending distance H which the runner must be moved in order to avoid contact between the runner 5 and the throat portion of the discharge ring 15b by horizontal axial movement of the runner 5 when removing it from the discharge ring 15. The removal of the upper supporting column 22 makes it easy to move the runner horizontally without any interaction with the discharge ring 15. Further, this removal of the runner 5 is not accompanied by the horizontal and lateral movement of the discharge ring, so that it is not necessary to make the width of the housing larger and any interaction with various devices such as lubrication oil tanks 28, 29, waste water pumps 26 connected to a waste water pit 25, feed pumps 27 etc. take place. Therefore the width can be reduced. The housing width can be reduced by 15-20% compared with the width of the housing having a discharge ring that must be moved laterally.

Further, an assembling room is temporarily used to store the discharge ring 15 at the time of assembling and disassembling. The room space is reduced by about 15-20% because only the upper half discharge ring 15a is stored.

Figure 4:
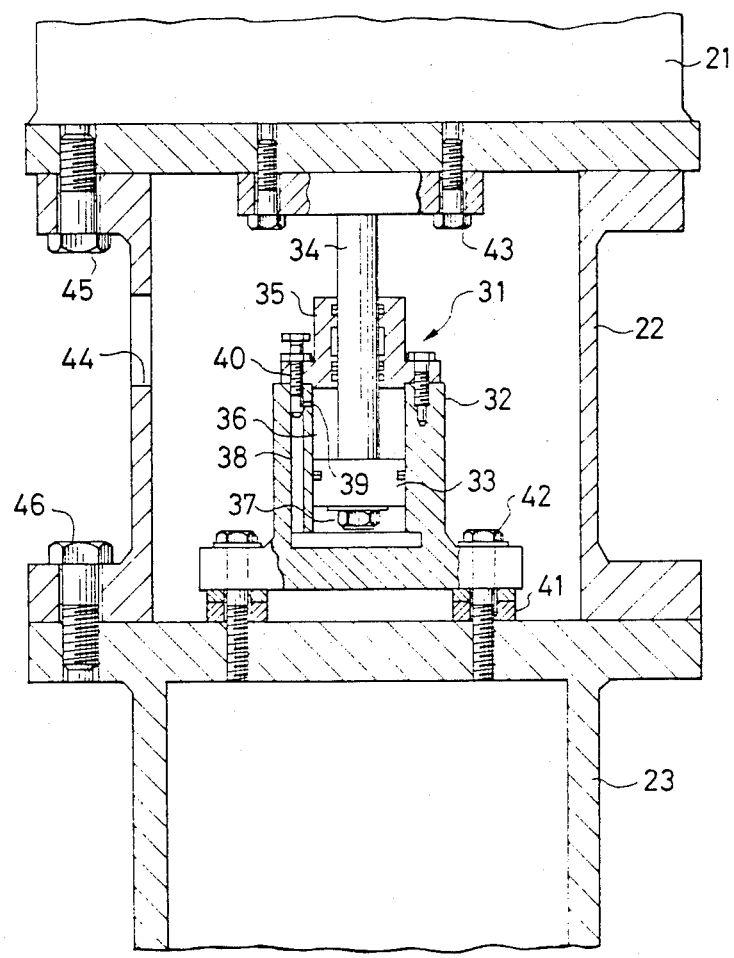
FIG. 4 is a partial sectional view of a supporting structure according to the present invention.

In FIG. 4, the upper and lower supporting columns 22, 23 are secured to each other by bolts 46 at their flanges. The upper supporting column 22 is secured to the supporting foot 21 by bolts 45. The upper supporting column 22 has a smaller spring constant than the lower supporting column 23 so that when a load such as a vibration is applied, the displacement is absorbed in a vibration damper 31. The upper supporting column 22 is divided into two or more parts by a vertical plane including the axis of the column 23 and integrated into one piece by means of flanges and bolts (not shown). In the upper supporting column 22, the vibration damper 31 is disposed. The vibration damper comprises a cylinder 32, a piston 33 slidably inserted in the cylinder, a rod 34 connected to the piston, and a cover plate 35 secured to the cylinder 32 to define an oil chamber which contains high viscocity oil and is divided into upper and lower chambers 36 and 37 by the piston 3. The two oil chambers 36 and 37 are fluidly connected by an oil passage 38 and a fine hole 39. The opening of the hole 39 is adjusted by a throttle adjusting screw 40. A hole 44 is for inserting an adjusting tool, etc. The vibration damper 31 is mounted on the lower supporting column 23 by an adjusting liner 41 and bolts 42 and on the supporting foot 21 by means of flange and bolt 43.

When a large vibration takes place transiently in the discharge ring 15, the vibration is transmitted to the upper and lower supporting columns 22, 23 and the vibration damper 31. In the vibration damper 31, the vibration is transmitted to the piston rod 34. When the displacement of the piston rod 34 is downward, the pressure in the lower chamber 37 is raised so that the oil flows into the upper chamber 36 through the passage 38 and the communication hole 39. The movement of the high viscosity oil is controlled by the opening of the communication hole 39, and the vibration is reduced by the viscosity resistance. The displacement speed due to the vibration is greatly reduced, and the displacement caused after that also is reduced drastically. Namely, since the vibration damper utilizes the viscosity resistance for the vibration damping, the vibration damping effect is remarkably great, and reaches to a level of several hundred times as large as the usual rigidity vibration damping effect. Accordingly, the vibration damper 31 can damp drastically the transient large vibration so that such a problem as caused in a conventional turbine of this kind can be avoided.

Further, the vibration damper 31 can absorb, to reduce, a large scale movement caused when the vibration system of the turbine falls into a resonant condition, whereby the turbine can be safely operated.

Still further, in the supporting columns 22, 23 constituted by the upper and lower supporting columns 22, 23, the rigidity, that is spring constant, of one of the upper and lower supporting columns 22, 23 can be changed easily, so that the spring constant, the natural vibration frequency, of the whole vibration system including the discharge ring 15 and the outer vane (wicket gate) case can be changed widely. Namely, the whole spring constant $K_t$ which is nearly equal to $K_b(K_t \approx K_b)$ can be changed to $(0.3–1.2)K_t$, so that it is easy to deviate the vibration from the resonance.

The measurement for deviating the vibration from the resonance has been very expensive and difficult in its technique. According to the embodiment, it is easily effected without causing any problems and the cost can be reduced to about 10% of the cost at which the conventional technique was put into practice.

What is claimed is:

1. In a discharge ring supporting structure of an adjustable-blade axial-flow turbine having a bulb containing a generator and a main shaft therein and disposed along a water flow, a runner mounted on an end of said bulb on the downstream side and having a plurality of blades, and a discharge ring surrounding said blades of said runner so as to form a throat portion, the diameter of which is smaller than the maximum diameter of a circle formed by the rotation of said blades around the axis thereof, said discharge ring supporting structure being connected to said discharge ring and a fixed floor, characterized in that said discharge ring supporting structure comprises a plurality of supporting members vertically integrated, and at least one of said supporting members being detachably mounted to the lower half of said discharge ring which is divided by a horizontal plane into upper and lower halves, and to the other supporting member, whereby the height of said discharge ring supporting structure is adjustable.

2. The discharge ring supporting structure as defined in claim 1, wherein said plurality of supporting members each comprise upper and lower supporting members, the height of said upper supporting member being larger than the minimum distance by which said lower half discharge ring is lowered to enable said runner to move axially and freely from contact between said discharge ring and said runner blades.

3. The discharge ring supporting structure as defined in claim 2, wherein said discharge ring comprises a plurality of upper and lower supporting members, at least two said upper and lower supporting members being arranged on the same periphery of said lower half discharge ring, and at least one said upper and lower supporting member being arranged on said lower half discharge ring at a position different from said periphery on which said two upper and lower supporting members are arranged.

4. The discharge ring supporting structure as defined in claim 2, wherein one of said upper and lower supporting members is smaller in rigidity than the other and includes therein a vibration damper.

5. The discharge ring supporting structure as defined in claim 2, wherein at least one of said upper and lower supporting members cylindrical and contains therein an oil damper for damping vibration caused in said discharge ring.

6. The discharge ring supporting structure as defined in claim 5, wherein said upper supporting member is cylindrical, and said oil damper comprises a cylinder secured to said lower supporting member, a piston disposed in said cylinder and dividing the interior of said cylinder into two oil chambers, a rod connected to said piston and said lower half discharge ring, a passage communicating between said two oil chambers, and an adjustable screw provided in said passage for adjusting flow of oil from one of said oil chambers to the other of said chambers.

7. An adjustable blade axial-flow turbine with a discharge ring supporting structure for supporting the discharge ring above a fixed floor, comprising:

a bulb containing a generator and a main shaft therein and disposed within a water flow;

a runner mounted on an end of said bulb on the downstream side thereof and having a plurality of blades;

a discharge ring surrounding said blades of said runner so as to form a throat portion, the diameter of which is smaller than the maximum diameter of a circle formed by the rotation of said blades around the axis thereof, said discharge ring having an upper half and a lower half separately secured to each other at a horizontal plane containing a central axis of said discharge ring; and said discharge ring supporting structure including a plurality of supporting columns each mounted on said lower half of said discharge ring at their one end and on said fixed floor at their other end for supporting said discharge ring, each of said supporting columns comprising a plurality of column pieces vertically integrated, at least one of said column pieces being detachably integrated so that the height of said lower half of said discharge ring is adjustable and said lower half discharge ring can be lowered to enable said runner to move axially and freely from contact between said discharge ring and said runner blades.

8. The adjustable blade axial-flow turbine with a discharge ring supporting structure as defined in claim 7, wherein one of said plurality of supporting columns is smaller in spring constant than the other and includes therein a vibration damper for damping vibration caused in said discharge ring.

9. The adjustable blade axial-flow turbine with a discharge ring supporting structure as defined in claim 7, wherein a pair of said supporting columns are mounted on a first periphery of said discharge ring lower half and another pair of said supporting columns on another periphery of said discharge ring lower half, which is axially spaced from said first periphery.

10. An adjustable blade axial-flow turbine and discharging with a discharge ring supporting structure for supporting the discharge ring above a fixed floor, comprising:

a bulb containing a generator and a main shaft therein and disposed within a water flow;

a runner mounted on an end of said bulb on the downstream side thereof and having a plurality of blades;

a discharge ring surrounding said blades of said runner forming a throat portion having a minimum diameter portion downstream of said blades, said minimum diameter being smaller than the maximum diameter of a circle formed by the rotation of said blades, said discharge ring having upper and lower half portions separately secured to one another along a horizontal plane passing through the central axis of said discharge ring; and said discharge ring supporting structure having a plurality of supporting columns having opposite ends, one end of each of said columns being mounted to said lower half portion of said discharge ring and the other end of each of said columns being mounted to said fixed floor for supporting said discharge ring, each of said supporting columns being integrally formed from a plurality of column pieces integrally connected to one another such that at least one of said column pieces is removable for lowering the height of said lower half portion in relation to said fixed floor for enabling said runner to be lowered and moved horizontally without said runner blades contacting said throat portion of said discharge ring.

* * * * *